Feb. 24, 1970  U. Z. ESCOLI  3,496,848
PHOTOCOMPOSING MACHINES
Filed April 6, 1967  6 Sheets-Sheet 1
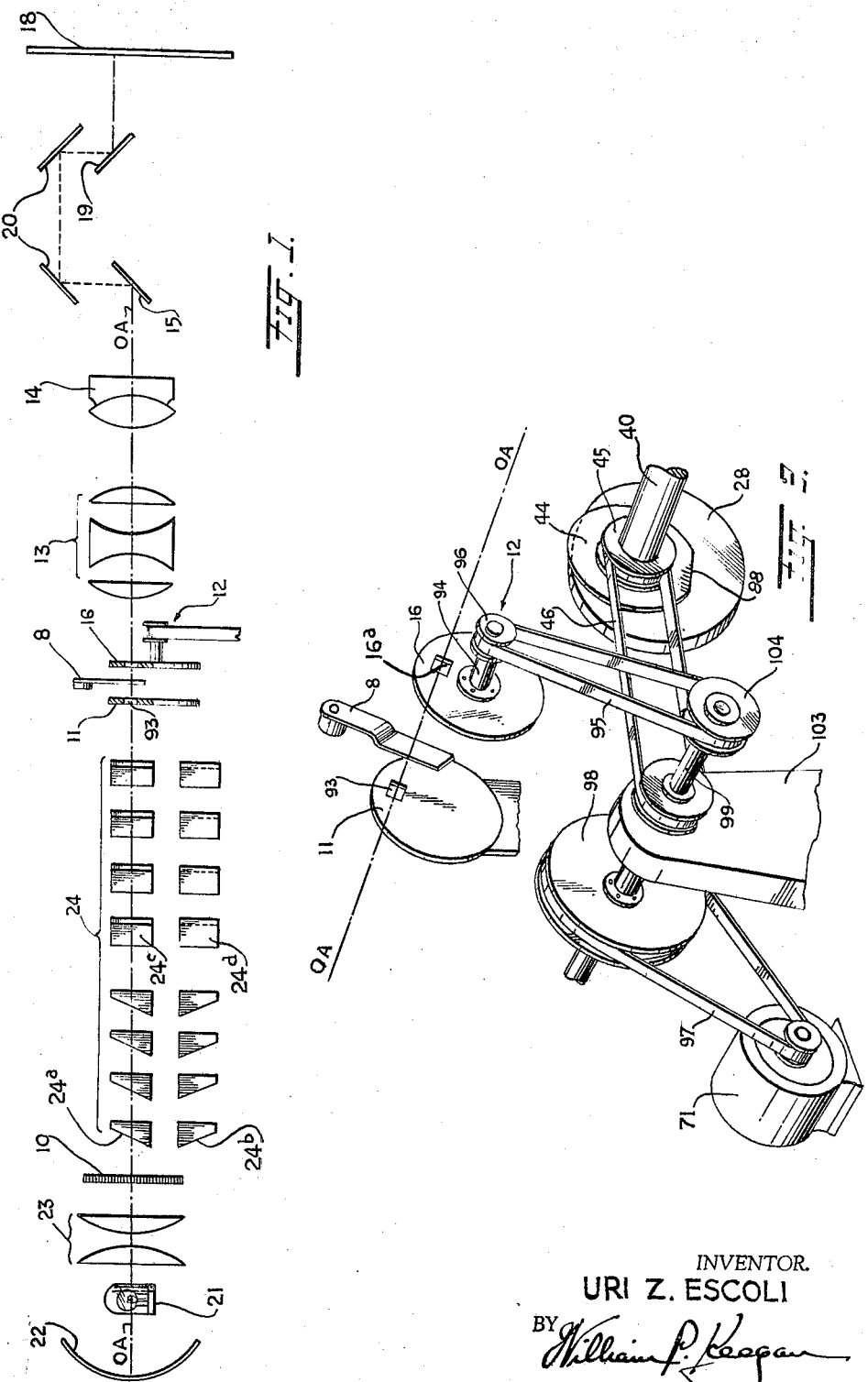
INVENTOR.
URI Z. ESCOLI
BY *William P. Keegan*
ATTORNEY

United States Patent Office 3,496,848
Patented Feb. 24, 1970

3,496,848
PHOTOCOMPOSING MACHINES
Uri Z. Escoli, New York, N.Y., assignor to Eltra
Corporation, a corporation of New York
Filed Apr. 6, 1967, Ser. No. 628,903
Int. Cl. B41b *13/08, 15/10*
U.S. Cl. 95—4.5                                    5 Claims

ABSTRACT OF THE DISCLOSURE

A character selection apparatus to be used in photocomposing machines. A plurality of moveable arms each holding a pair of optical prisms of equal refractive power are positioned in the optical path of character images being projected. The characters are selected from a stationary font plate. By moving the arm members to a selected position, the character images are placed in the correct alignment on the recording medium.

BACKGROUND OF THE INVENTION

In U.S. Patent 2,942,538, the basic scheme of character selection employing optical prisms is disclosed. As taught, a plurality of optical prisms, each having a different light refracting power, are placed in the light path of an illuminated character array. The prisms are actuated so that unique combinations of them are interposed in the light path and only the beam from the character associated with a selected combination of prisms will be shifted onto the optical axis of the photocomposing machine. The system utilizes the following optical principle: when a beam of light is passed through a triangular prism, it will be refracted or bent at one or both surfaces of the prism thus producing a deviation of the beam from its initial path, the deviation being dependent of the refraction angle of the prism. This refraction angle varies from prism to prism so that the rays through individual prisms are bent through different angles. Another characteristic of such a prism is that it has no optical axis therefore, the refraction angle remains constant as light rays pass through the prism. The angle is not affected by vertical or horizontal prism movement but rotation of the prism does produce a corresponding angular displacement; thus, one optical prism with the proper refractive angle can be positioned in an optical path so as to select four different character locations. When a combination of prisms is used, many such locations can be selected by the sum of the refraction angles of those wedges arranged with their vertices pointing in the same directions.

In one embodiment of the character selecting scheme described above, eight pairs of opposed optical prisms are provided, four pairs of prisms being arranged in a set to refract a light beam horizontally and four pairs being arranged to refract a light beam vertically. The prisms in each set have four different face angles that are related as the binary numbers 1, 2, 4 and 8. Thus with the prisms used it is possible to select one of fifteen horizontal rows and one of fifteen columns intersecting therewith, or one out of a possible two hundred and twenty-five positions. Actually, about one hundred and eighty positions are used for characters, numerals, and punctuation marks.

SUMMARY

The object of the present invention is to provide an improved device for selecting a desired phototypographical character from a stationary font plate and positioning the selected character on the optical axis of the photocomposing machine.

The device comprises a plurality of moveable arms, each of which holds a pair of optical prisms of equal refractive power but arranged to refract light in either of two directions. The refractive power of the prisms held by the different arms varies between arms, and by individually moving these arms so as to place selected prisms into an optical path a selected character from a stationary font plate is projected to the optical axis of the machine.

BRIEF DESCRIPTION OF THE DRAWINGS

Features and advantages of the invention will be gained from the foregoing and from the following description of a preferred embodiment of the invention as illustrated in the accompanying drawings.

In the drawings:

FIG. 1 is a schematic elevational view of an optical system showing the prism arrangement of the present invention in one operative position;

FIG. 2 is a perspective showing of the drive mechanism for the shutter mechanism and the mechanism for positioning the prisms of FIG. 1;

FIGS. 5A to 5D are detail views of the latching mechanism shown in FIG. 5;

DESCRIPTION OF THE PREFERRED EMBODIMENT

Figure 3:
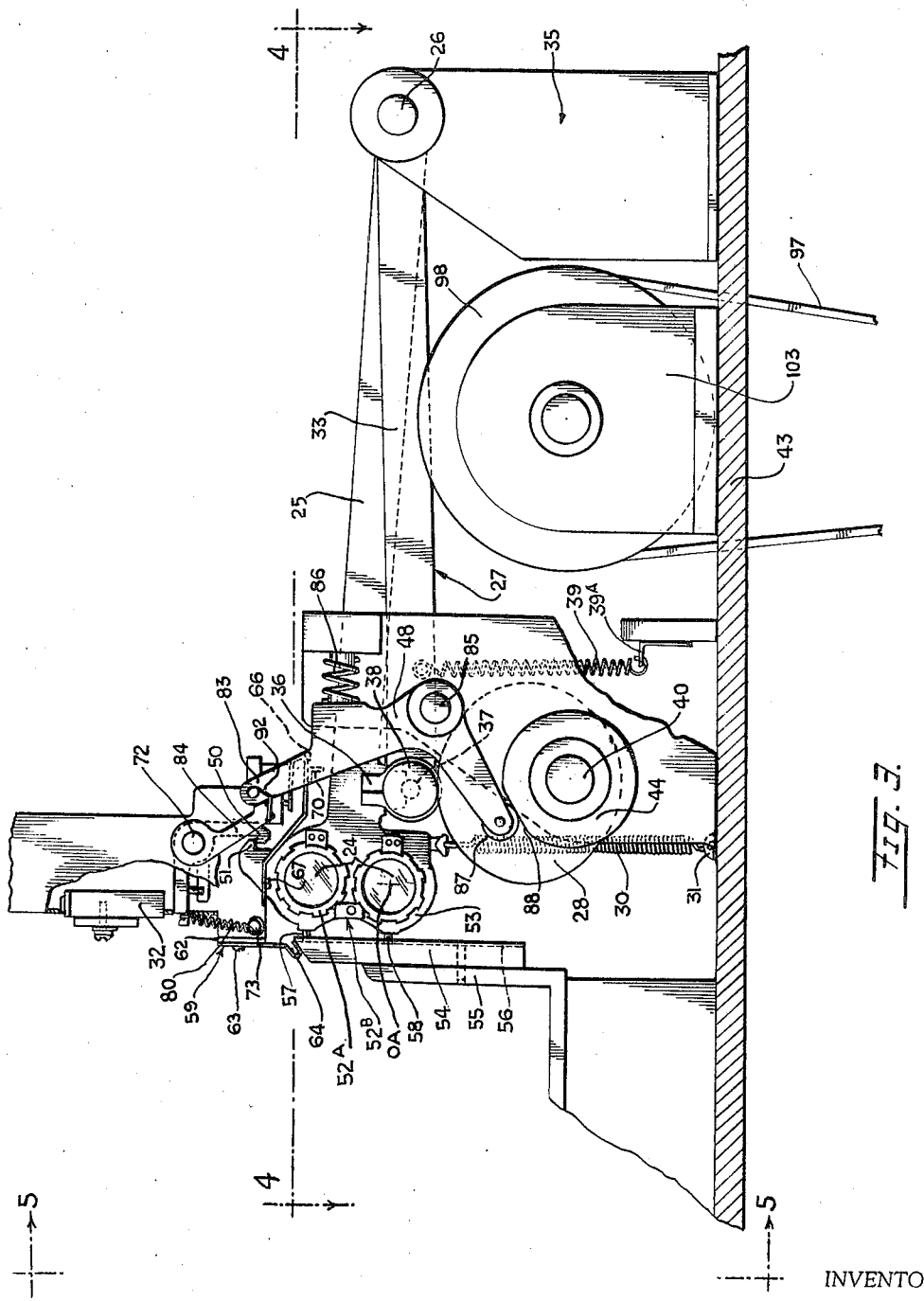
FIG. 3 is a plan view of the prism positioning mechanism.

The present invention relates to a simple mechanism which provides means for positioning selected optical wedges in the optical axis of a photocomposing machine. Specifically, it provides a plurality of identical optical prism pairs located 180° out of phase with each other. Character selection is accomplished with only one prism of each pair positioned in the optical axis. Each pair of prisms is fixedly mounted in an arm member which is pivoted about a fixed shaft. These arms rest near their prism-carrying ends upon a cradle assembly which is also pivoted upon the fixed shaft. The cradle is cam-operated and is adapted to be periodically raised and lowered. Positioned above the prism end of the arms is a series of latching mechanisms, one for each arm. When an arm is raised by the cradle to its upper position, its associated latching mechanism will either be energized or de-energized. If energized, the arm will be held in its upper position and will be disengaged from the lowering cradle as the latter descends. Actual character exposure of the selected character, accomplished by a shutter mechanism, takes place in timed relation with the low dwell of the cams. In this position, if a latching mechanism is energized, the lower prism of the pair will be positioned in the optical axis, whereas, if it is de-energized, the upper prism will be so positioned.

The basic optical system in which the present invention is embodied is schematically illustrated in FIG. 1. Referring to FIG. 1, the font plate 10, which preferably comprises an orthogonal area of translucent characters on an opaque background, is illuminated, resulting in the projection of character-formed beams of light. The beams of light are bent by prisms 24 but only the light from the selected character is refracted to coincide with the optical axis OA of the system and is projected through a mask 11 which blocks the transmission of light from all characters but the selected one. A shutter mechanism 12 controls the precise instant at which the selected beam is projected to the sensitized material. The latter's operation is timed with respect to the operation of the prisms by the same source of power used to position the optical prisms. The selected beam then passes through an arrangement of point-size changing lenses 13, and a second image lens 14. The latter lens is used to focus the final character image on a stationary mirror 15, a part of the mirror system used for translating the final image onto film 18. The mirror 19 is displaced by an amount equal to the width of each character to be composed, and the pair of mirrors 20 are displaced in the same direction by half that amount in order to equalize the optical distance from the lens 14 to the film 18 for all character projections, thus maintaining the characters in sharp focus.

The font or grid plate 10 is illuminated by projection lamp 21. The light from this lamp is intensified and directed towards the array of characters by a reflector 22 and a condensing lens 23 which distributes the light evenly over the entire area of the character array. Shutter mechanism 12 controls the exposure of the selected character on film 18 but, if preferred, the shutter could be eliminated and lamp 21, instead of being continuously illuminated, could be a flash lamp which is operated at the time a character image is to be projected.

In the present system, the characters are individually selected for composition by a number of optical prisms 24, arranged in pairs and interposed along optical axis OA. The two prisms of each pair have equal deviating power, but one prism, e.g. 24a, will bend the light rays downwardly, while the other, 24b, will bend the rays upwardly. Other prism pairs are provided to bend the light rays into the sheet 24c and out of the sheet 24d in the illustration. For convenience, only the top prism of each pair is shown interposed in the optical axis OA.

Figure 4:
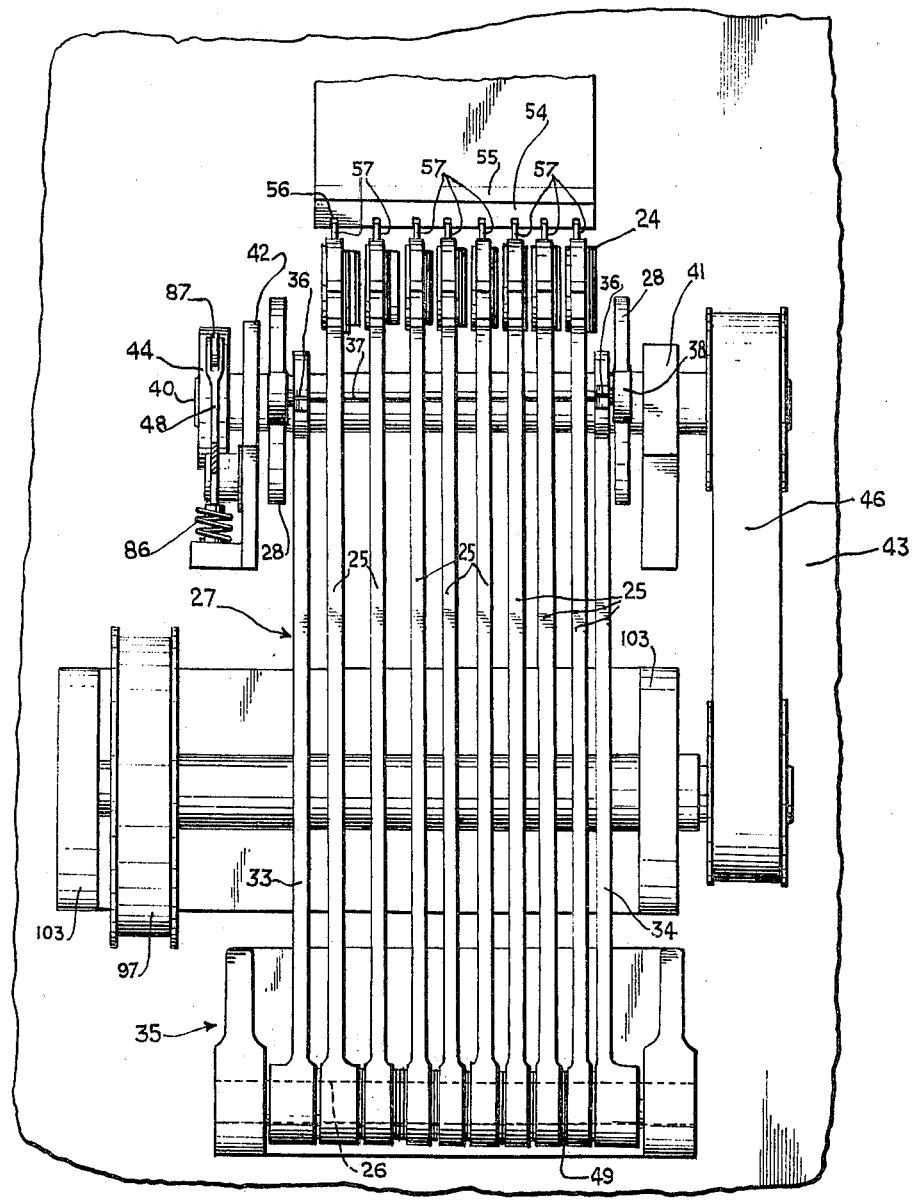
FIG. 4 is a sectional elevational view taken on line 4—4 of FIG. 3.

As previously mentioned, each pair of prisms is fixedly mounted on an arm member. FIG. 3 shows a single arm member 25 pivotally mounted on shaft 26 while FIG. 4 shows all eight arm members of the present invention mounted on shaft 26 with positioning spacers 49 separating adjacent arms. Prisms 24 (FIG. 3) are shown to be mounted at the end of arm 25 within rotatable adjustment assembly 52A. This assembly can be rotated and locked into position at locking member 52B; thus the prism can assume various rotation positions. The assembly, in turn, is secured in prism-carrying housing 53 on arm 25. The prisms themselves are mounted one above the other so that only one prism in each pair is interposed in the optical axis OA at a time.

Arm 25 is shown in its "latched" position in which the detent 51 formed on arm 25 is engaged with latching crank 50 (shown in detail in FIG. 5c). In this arm position, the lower prism of the mounted pair is in the optical axis. Each arm is provided with a return spring 30 which is fastened to it and to the machine frame at clip 31. This spring exerts a downward force on the arm which maintains the arm in engagement with cradle assembly 27. When the arm is latched in its upper position, the spring, of course, is tensioned. In this cradle-engaged position, the upper prism of the pair is interposed in the optical axis when cam 28, which drives the cradle, reaches its low dwell. The means for controlling the arm-latching condition will be described in detail later in this specification.

Figure 6:
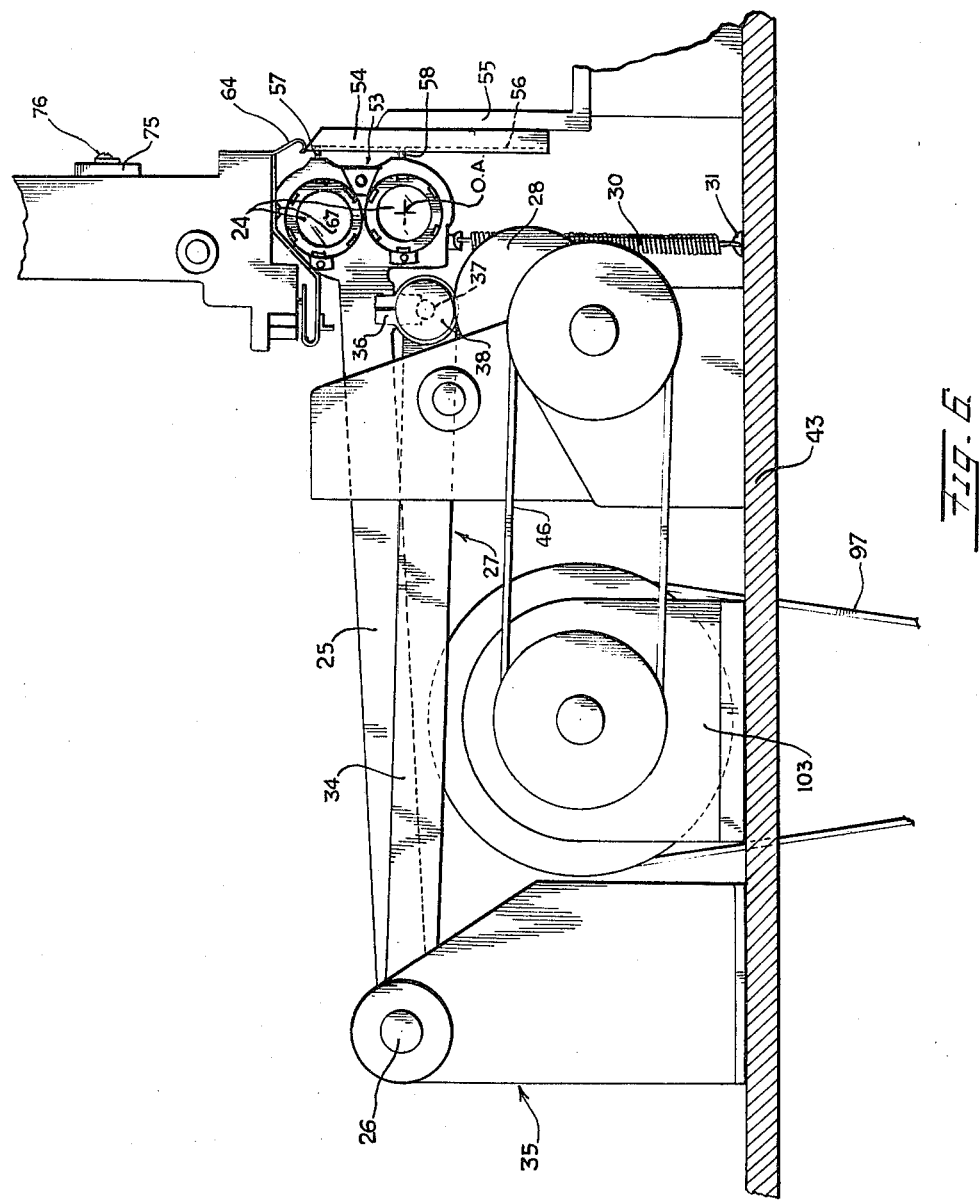
FIG. 6 is a front view of the prism positioning mechanism.

Cradle assembly 27 (FIGS. 3, 4 and 6) comprises two arms 33 and 34 which also pivot on shaft 26. This shaft is fixed on the uprights of a U-shaped frame member 35. The opposite ends of both arms 33 and 34 are formed as a clamping terminal 36 which supports a shaft 37 which traverses the width of the cradle and projects outwardly from arms 33 and 34. Mounted at each remote end of shaft 37 are cam follower rollers 38 which ride on cams 28. Two tension springs 39 which are respectively fastened to arms 33 and 34 of carriage 27 and also to the machine frame at angle 39a insure that rollers 38 closely follow cams 28. These cams 28 are eccentrically mounted upon the opposite ends of shaft 40 which is rotatably supported in trunnions 41 and 42 on the machine frame 43. As shown in FIG. 2, another cam 44 and a pulley 45 are keyed to one end of the shaft 40 which is then driven continuously by a belt 46 trained about pulley 45. As shaft 40 is made to rotate, it will rotate cams 28 whose eccentricity causes a periodic rise and fall of cradle assembly 27. At its high point shown in FIG. 3, the cradle will engage only those arms whose associated latching mechanisms have not been energized. As the cradle recedes from its high point, it will carry the engaged arms with it for at least one cycle while the non-engaged arms remain in their latched positions.

Figure 5:
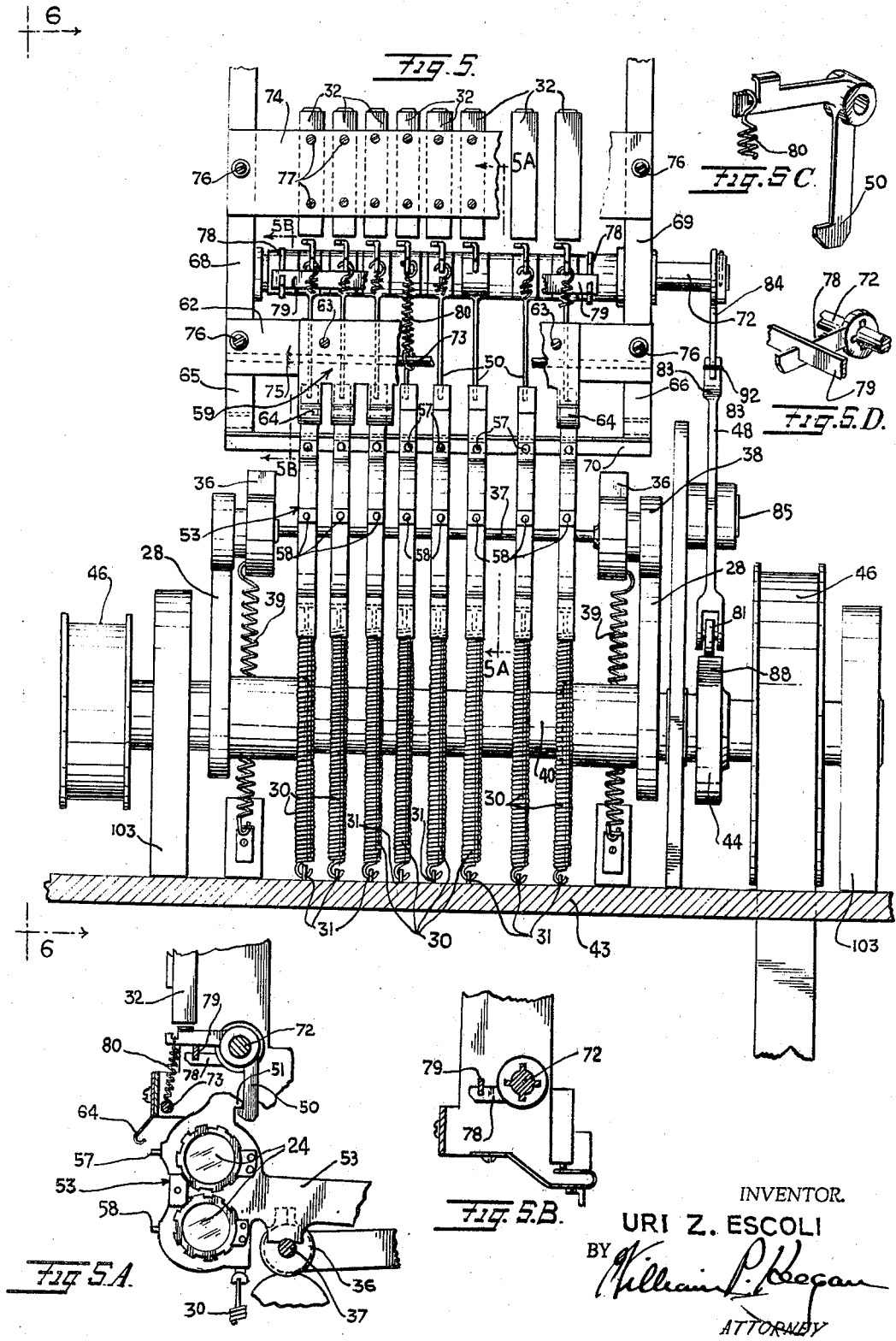
FIG. 5 is a side elevational view taken on line 5—5 of FIG. 3 with guide bar and supporting bracket removed.

FIG. 5 shows the elements used to selectively latch and unlatch arms 25 from latching mechanism 32 in timed coincidence with the periodic rasing and lowering of cradle 27. A series of eight latching mechanisms 32 are fastened to support plate 74 by screws 77. Side walls 68 and 69, fixed to machine frame 43, provide support for plate 74, plate 75 (which anchors shroud plate 59) and shafts 72 and 73. Plates 74 and 75 are secured in place by machine screws 76. Each latching mechanism 32 has located directly beneath it a latching crank 50 (shown in detail in FIGS. 5A and 5C) which is rotatably mounted on shaft 72. The end of each crank is formed to engage detent 51 of arm 25 and, when so engaged, will support arms 25 in the position where the lower prism of prism pair 24 is in the optical path.

Two brackets 78 are fixed to opposite ends of shaft 72 and support an actuator rod 79 which controls the operation of the latching mechanisms 32. The latching crank 50 is normally kept in an engaging relation with rod 79 by the action of spring 80 (FIG. 5A). This action produces a downward force on the rod which is transmitted through support members 78 to shaft 72 urging it to rotate in a counter-clockwise direction and causing the same bias on the latching crank. Lever 84, which is fixedly mounted on shaft 72, is biased by this same force into a slideable engagement with a cutout arm 83 of a bell crank 48 by a U-shaped spring 92 (FIG. 3) fastened over arm 83 to loosely engage lever 84. The bell crank 48 is pivotably mounted on support stub shaft 85 and biased in a counter-clockwise direction by compression spring 86. This bias causes a rotatably mounted follower roller 87 to maintain frictional engagement with cam member 44 mounted on shaft 40. This cam member is circular except for a chord cut 88. In FIG. 3, cam follower 87 is shown to be in engagement with this portion of the cam member. The function of bell crank 48 and cam 44 is to reverse the bias on shaft 72 in timed relation to the high dwell of cam 28 and cradle 27 and cause it to transmit the reverse bias, through actuator rod 79, to the latching crank 50. This creates a clockwise movement of the latching crank 50 and places it in a position to be magnetically affixed to latching mechanism 32 and thereby in position to secure arm 25 in a raised position. Of course, if on the preceding cycle arm 25 was so secured and it is now desired to lower the arm, cam 28 will raise the cradle 27 to lift arm detent 51 off of lever 50, and the latching mechanism 32 will be deenergized to allow lever 50 to pivot out of the way of the descending arm 25.

The operation of bell crank 48 and cam 44 is as follows: during the interval follower 87 rides on the circular portion of cam 44, cradle assembly 27 is either being reciprocated downward or upward by cams 28. At the time assembly 37 is raised to its upper position (corresponding to the high dwell of cam 28), cam follower 87 engages the chord 88 of cam member 44. The action of spring 86 will cause bell crank 48 to move counter-clockwise; this action is transmitted through arm 85 lever 84 to shaft 72. Shaft 72 is forced to rotate clockwise and this motion is transmitted, through support members 78 and rod 79, to latching cranks 50. The cranks are forced upwardly into close proximity to their associated latching mechanisms 32. Let us assume that on the previous cycle four latching mechanisms had been energized and four latching mechanisms had been unenergized when cradle 27 reached its upper position. This would have resulted in the four wedge arms associated with the energized mechanisms remaining in a latched position and the other four in an unlatched position. Assume further that the situation is now reversed, i.e., the four mechanisms that were energized are now de-energized, etc. Since all latch cranks 50 are moved in close proximity to their respective latching mechanisms, those four associated with the energized arms are drawn into a magnetic engagement with them. As the cradle assembly rises to its high dwell positions, the four arms that were assumed to be carried by the cradle will contact their latching cranks. Detent 51 will slide around and over the associated latching crank 50 and again be in the latching position shown in FIG. 5A. When the cradle assembly descends (as cam 28 retreats to its low dwell) the attraction of engaged mechanism 32 will prove stronger than the downward pull of springs 30 and the prism arm 25 will stay raised in the latched position. The arms are now completely independent from cradle assembly 27 and shaft 37.

Those arms which had previously been in the latched position will now be pulled down into engagament with cradle 27 by springs 30 since there is no counter-balancing magnetic force at their associated mechanisms. Therefore, when follower 87 again engages the circular position of cam 44 and bell crank 48 is pivoted clockwise, actuator rod 79 drops away from latching crank 50. If arms 25 are attached to energized coils, they will separate from their respective rods. If they are attached to de-energized coils, they will slide out of engagement with the latching cranks. As cams 28 move to their low dwells and the cradle assembly pivots downward, the unselected arms, now engaged, will move therewith. At the low dwell of cam 28, a shutter mechanisms 12 (FIG. 2) operating in timed relation will expose the selected character on the film. Those prisms which are positioned in the optical axis will select the required character from the character array. In the assumed case the upper prism of the four unlatched arms and the lower prism of the four latched arms will be positioned in the optical axis.

The arrangement for operating shutter 16 is shown in FIG. 2. Mask 11, positioned adjacent optical axis OA, is formed with a window 93 cut therein which allows the proper character rays to pass through and fall on the film. The shutter 16 is mounted for rotation on shaft 94 and is continuously driven by belt 95. The belt is trained about pulley 96 which is fixed to shaft 94. Exposure on the film occurs at the same time that window 16a allows the selected character image to pass through and fall on the film. The exposure takes place in timed relation with the low dwell of cam 28 after the proper character has been selected by the optical prisms. The main driving means for cams 28 and shutter 16 is a synchronous motor 71. This motor drives a belt member 97 which is trained about and rotates pulley 98 fixed to an intermediate shaft 99. Shaft 99 is journalled in side supports 103 (only one of which is shown) and, in turn, has two drive pulleys fixed thereto. Pulley 104 operates belt 95 which, as indicated, drives the shutter. If it is desired to prevent exposure of a selected character without stopping the character prism device, then a flag 8 need only be pivoted into the portion of the optical axis located between mask 11 and shutter 16. Flag 8 could, if desired, be solenoid operated.

Several safety features are incorporated into the apparatus, one of which is a guide bar 54 shown in FIG. 3. Bar 54 extends the width of cradle 27 and is fixed to support bracket 55. Eight transverse grooves 56 are cut in bar 54, one for each arm. Each groove 56 is adapted to have two pins 57 and 58 formed on the housing 53 of each arm slide therein. By this simple method lateral movement of the prisms is prevented and proper character selection insured.

An additional safety feature (see FIGS. 3 and 5) is provided which becomes operative when an arm 25 separates from cradle 27. A shroud plate 59 fastened to plate 62 by machine screws 63 is provided with eight separate detent fingers 64 (FIGS. 3 and 5) one for each arm. As shown, if an arm 25 is driven upwardly beyond the position where it is to be latched, then the top pin 57 will be driven into a corresponding detent 64 and will of course remain in engagement therewith until manually released. This single device will prevent any possible deleterious jarring effects to the prisms fixed in housing 53 of each arm.

Still another safety feature becomes operative if spring 30 breaks. Two resilient spring members 65 and 66 (FIG. 5) are each fastened by screws 67 to walls 68 and 69 respectively. The other end of these members, as seen in FIG. 3, is bent in U1-shaped fashion. The under side of the U-shaped portion has a bar 70 fixed thereto such that it extends transversely across the arms 25 at a position proximate to these arms near the housings 53. In normal operation this bar will not be engaged. However, if a spring 30 fails and its associated arm is thrown upwardly by the action of cam 28, the arm will be driven upwardly against the spring biased bar 70. The top portion of the U section of both members 65 and 66 are thereby driven into engagement with microswitches (not shown) fixed to the walls 68 and 69. These switches, when engaged, operate to shut off synchronous motor 71 (FIG. 2) which is the main source of power for the cradle assembly 27.

The electrical circuits required to place the wedges into their desired character selection positions will now be described. As previously explained, each wedge arm 25 (FIG. 3) has associated with it a latching mechanism 32. The normal position of the wedge arms are in the "up" or latched position and, in this position, the lower wedge of the wedge pair 24 mounted on each arm will be in the optical path. The wedge arms are held in this position by maintaining a current through the coil of the latching mechanism associated with each arm, thereby keeping them energized and providing the magnetic field required to hold fast the associated wedge arm latching crank. If this current is suspended, the latching mechanism coil is de-energized, the magnetic field dissipated, and the arm is spring-urged down to the unlatched position thereby placing the upper wedge of the wedge pair into the optical path. Two paths are provided for this energizing current to reach the coils: one path is controlled by a tape reader code detection circuit and the other is through a time-controlled circuit which is periodically interrupted. The latter circuit maintains a continuous current flow to all the latching mechanism coils except during a period coinciding with the presentation of a character during which interval current flow to all the coils is completely interrupted from this source. Whether the individual coils stay energized now depends upon whether a coded input is being applied to them from the tape reader. It is thus possible to have various combinations of upper and lower wedges of separate wedge pairs in the optical path during any given character presentation interval depending upon the state of energization of their associated latching mechanism coils.

Figure 7:
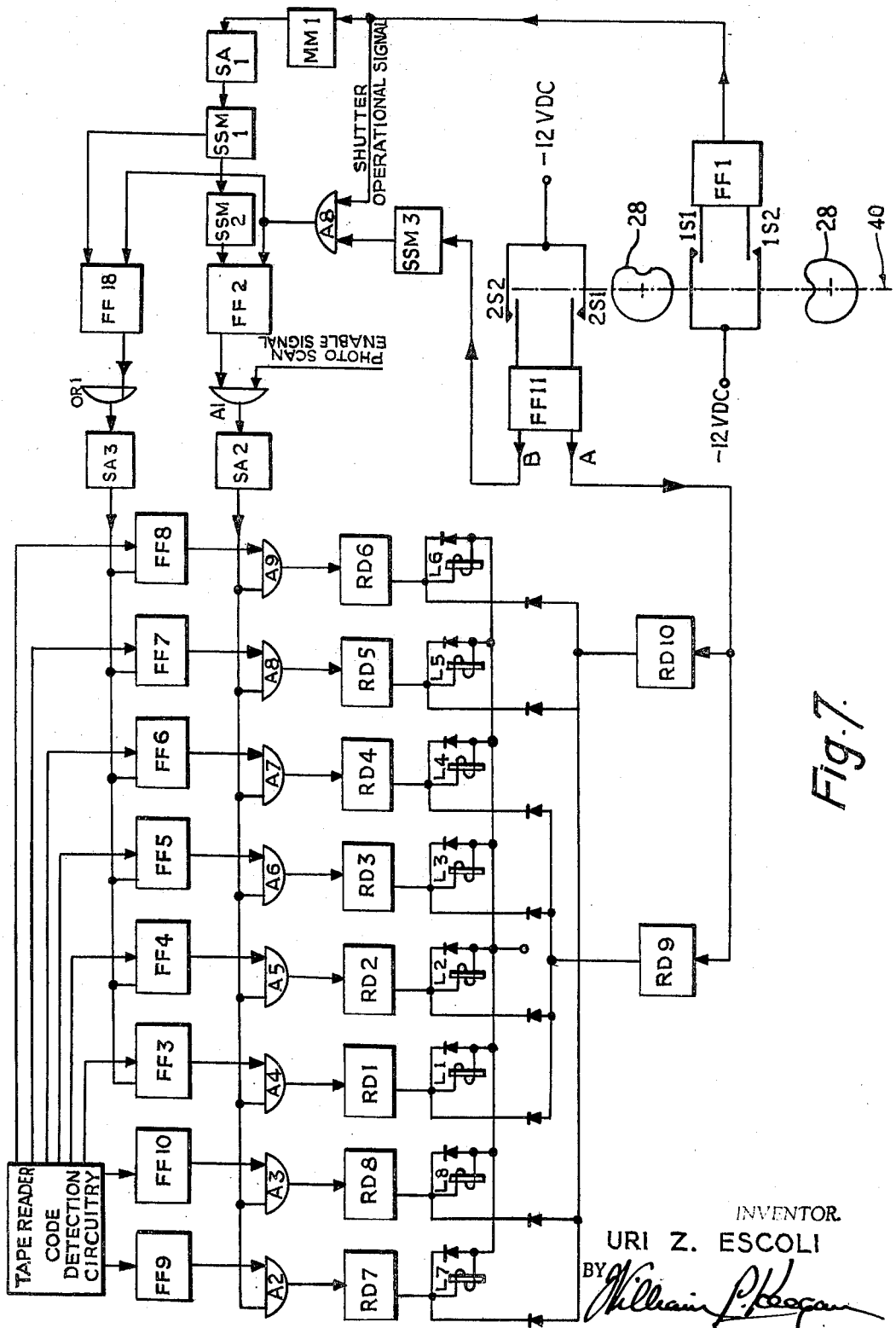
FIG. 7 is the electrical circuit used to energize the prism positioning means.

The timing for the energization and de-energization of the latching mechanism coils is established by the opening and closing of magnetically operated reed switches 1S and 2S (FIG. 7). Cams 28, mounted on shaft 40, rotate with the shaft and periodically interrupt the magnetic fields of the coils of latching mechanism 32 (FIG. 2). When the field is interrupted, switches 1S and 2S open, and when the field is not interrupted the switches close.

The closing of switch 1S generates a zero time pulse and marks the point during the operating cycle from which all other actions are timed. The closing of switch 2S causes the generation of a character select pulse which is used to interrupt coil current to the latching mechanism discussed above so that the wedges required for the succeeding character to be presented can be selected.

Referring to FIG. 7, one cycle of the machine as measured by one revolution of shaft 40 will be described. Near the end of a preceding cycle prior to time $t_0$, the output at switch contacts 1S1 is $-12$ volts and at contacts 1S2, 0 volt. These outputs are applied to flip-flop FF1 to produce an output of $-12$ volts. At 9 milliseconds before time $t_0$, switch contacts 1S1 open applying zero volts to FF1. Switch contacts 1S2 engage at the zero degree rotation point to apply $-12$ volts to FF1 and cause the output of FF1 to rise to 0 volt. As the output of FF1 goes to 0 volt, the rising edge of the pulse triggers monostable multivibrator MM1 which, in turn, generates an output pulse 10 microseconds wide. The leading edge of the pulse establishes $t_0$. Switch contacts 1S2 separate at $t_0$ plus 9 milliseconds and contacts 1S1 engage at $t_0$ plus 18 milliseconds to reset FF1 by applying $-12$ volts. At time $t_0$, the output of MM1 is applied to squaring amplifier SA1 and the clock pulse output of the latter is in turn applied to single shot multivibrator SSM1 causing the output of SSM1 to drop to $-12$ volts for 17 milliseconds. This 17-millisecond wide negative-going pulse is applied to single shot multivibrator SSM2 causing an output at SSM2 of $-12$ volts beginning at time $t_{17}$ milliseconds. The output at flip-flop FF2 goes to $-12$ volts at this time and is applied to AND gate A1. This gate will be enabled when a photo scan enable signal is received during photocomposition. The $-12$ volts that appears at A1 passes through squaring amplifier SA2 and is applied to AND gates A2 through A9.

During this time, another $-10$ volt input will appear at the input to these AND gates if such a signal has been generated in the Tape Reader Code Selection Circuitry. At time $t_0$ another pulse directed to this code detection circuitry has caused the next character and its identity to be decoded. If a wedge arm is to remain in its latched position, a $-12$ volt input is applied to the associated one of flip-flops FF3 through FF8. If a wedge arm is to be unlatched, no signal is sent to the associated flip-flop. If both signals are present at the AND gates, it is enabled and a $-12$ volt output is applied to wedge selection relay drivers RD1 through RD6. Similarly, if a rail or shift wedge arm (these wedges determine the quadrant on the character array from which the other wedges will scan and select the character), a $-12$ volt or 0 volt signal, respectively, will be applied to relay drivers RD7 and RD8 through flip-flops FF9, FF10 and associated AND gates A2 and A3. The relay drivers RD1 to RD8 will cause their respective coils L1 to L8 to be energized provided a $-12$ volt input is applied to a relay driver.

The alternate current path to coils L1 to L8 is maintained through flip-flop FF11 and wedge latching relay drivers RD9 and RD10. At time $t_0$ switch contacts 2S1 are engaged and contacts 2S2 are separated; $-12$ volts is then applied to flip-flop FF11 producing a $-12$ volt output at A and a 0 volt output at B. This A output is applied to coils L1 to L8 through relay drivers RD9 and RD10. At time $t_{16}$ milliseconds, contacts 2S1 separate to remove the $-12$ volts from FF11 but causing no change in its output. At time $t_{26}$ milliseconds, switch 2S2 closes applying $-12$ volts to FF11. This causes the A output to rise to zero volt and the B output to fall to $-12$ volts. At time $t_{34}$ milliseconds, contacts 2S2 separate, but cause no change in FF11's output and, finally, at time $t_{43}$ milliseconds, contacts 2S1 engage again to apply $-12$ volts to FF11 thus producing a $-12$ volt output at A and 0 volt at B. Thus, from time $t_{26}$ to time $t_{43}$, there was no input to relay drivers RD9 and RD10. Hence, coils L1 to L8 were not energized through this circuit during this interval. However, certain coils, may have remained energized during this period provided their associated relay drivers RD1 to RD8 were driven by the tape code input signals described above. Those coils that remained energized caused their associated wedge arms to stay in the latched position and those coils that were de-energized dropped their associated arms into the unlatched position. At time $t_{43}$, the circuit to all coils was restored through FF11, RD9 and RD10.

During the remainder of the cycle, reset signals are generated to reset flip-flops FF3 through FF10. At time $t_{43}$, the B output of FF11 rises to 0 volt and is applied to single shot multivibrator SSM3 causing a negative-going 10-microsecond pulse to appear at its output. This pulse is applied to AND gate A8 and, because of the $-12$ volt shutter operation input, a negative-going pulse appears at the gate output which is then applied to flip-flop FF12. Previously (at time $t_0$), the 12-millisecond wide, negative-going clock pulse produced at the output of SSM1 had also been applied to FF12 causing its output to rise to 0 volt. This new pulse from A8 now causes the output of FF12 to drop to $-12$ volts. This $-12$ volt output is applied through OR gate OR1 and squaring amplifier SA3 to reset flip-flops FF3 through FF10. The $-12$ volt output at SSM3 is also used to raise the $-12$ volt output at FF2 to 0 volt thereby removing the inputs to AND gates A2 through A9.

Having thus described the invention it is to be understood that many changes and apparently different embodiments could be made thereto without departing from its spirit or scope. Accordingly, the description and drawings of the preferred embodiment disclosed are to be interpreted in an illustrative rather than a limiting sense.

What is claimed is:

1. In a photocomposing machine having a stationary array of characters, a light source for illuminating the array, and a plurality of prism pairs selectively positioned in the path of the light projected from the array to deflect the light from a selected character onto the optical axis of the machine, the combination of a plurality of individually pivotally mounted prism holding members each holding a pair of prisms of equal deviating power one above the other and in opposite light defracting positions, means for actuating the prism holding members to raise the lower prism of each pair into the path of the light projected from the character array, said actuating means including a common cradle means for supporting the free ends of said holding members and cyclically actuated means for raising and lowering said cradle means, a selectively actuated latching means for each prism holder for latching selected ones of said prism holding members in a raised position, cyclically actuated means for rendering said latching means operative, and means for projecting the light from the character array through the lower prism of latched members and the upper prisms of the remaining members whereby the light from a selected character is projected along the optical axis of the machine.

2. The combination according to claim 1 wherein each latching means includes a bell crank hook which is cyclically pivoted to a prism holding member engaging position wherein it secures said member in a raised position, and means for retaining said hook in the engaging position and restoring it to a non-engaging position.

3. The combination according to claim 2 wherein said retaining means is a solenoid means.

4. The combination according to claim 3 wherein the cyclically actuated means include a continuously running motor, cam means driven by said motor for raising and lowering the cradle, and additional cam means driven by said motor for actuating the latching means.

5. The combination according to claim 4 including a rotatable shutter means driven by said motor for synchronizing the projection of light from the character array with the actuation of the prisms.

References Cited

UNITED STATES PATENTS

| 2,942,538 | 6/1960 | Bechtold | 95—4.5 |
| 3,200,927 | 8/1965 | Ryan | 340—347 |

JOHN M. HORAN, Primary Examiner

LEO H. McCORMICK, Jr., Assistant Examiner